UNITED STATES PATENT OFFICE.

LEWIS CHEESEMAN, SR., OF ALEXANDRIA, VIRGINIA, ASSIGNOR OF TWO-THIRDS TO A. H. AGNEW AND PARK AGNEW, OF ALEXANDRIA, VIRGINIA.

PROCESS OF TREATING NATURAL PHOSPHATES.

SPECIFICATION forming part of Letters Patent No. 690,048, dated December 31, 1901.

Application filed February 16, 1901. Serial No. 47,686. (No specimens.)

*To all whom it may concern:*

Be it known that I, LEWIS CHEESEMAN, Sr., a citizen of the United States, residing at Alexandria, in the county of Alexandria and State of Virginia, have invented a certain new and useful Process or Method of Treating Phosphates, of which the following is a specification.

The object of my invention is the provision of an improved process or method of treating naturally-occurring phosphates, such as apatites, coprolites, hard and soft phosphate-rock, &c., whereby the insoluble compounds thereof, as triphosphate of lime, may be converted into forms soluble in water or ammonium citrate, thus making the phosphoric acid "available," as so called.

My invention consists, broadly, in passing a current of electricity through a liquid mixture of comminuted naturally-occurring phosphate and a suitable reagent and changing the insoluble phosphate of lime to forms soluble in ammonium citrate and water.

Further, it consists in passing a current of electricity through a liquid mixture of comminuted naturally-occurring phosphate and an acid salt, such as acid sulfate of soda, (niter-cake.)

Further, it consists in passing a current of electricity through a liquid mixture of comminuted naturally-occurring phosphate and an acid salt, such as niter-cake, and then evaporating the liquid or water.

The successive steps of the process or method of treatment are as follows:

First. The naturally-occurring phosphate is reduced to a fine powder or comminuted in any well-known way, the treatment to which it is subjected depending upon its form. It may be passed through a crusher, then reduced to fine particles, and, if desired, screened to remove the coarser particles.

Second. The fine particles or "flour" should be mixed in a suitable receptacle with a liquid, preferably water and acid sulfate of soda, (niter-cake,) the relative quantities of each depending on the quality of the phosphate and the substances with which it may be associated in its naturally-occurring state.

Third. A current of electricity is passed through the mixture for a suitable period of time.

Fourth. The liquid or water is evaporated from the mixture.

During the third step of the process the mixture may be heated and agitated, if desired. I find that the action of the electric current upon the liquid mixture results in the formation of mono and dibasic phosphates, the monobasic being soluble in water and the dibasic soluble in ammonium citrate.

The chemical reactions aided by the electric current are as follows:

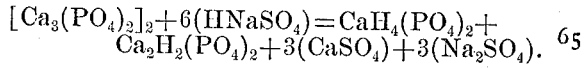

The reactions occur as specified without the passage of the current, but less completely and require a longer time.

The vessel for receiving the liquid mixture should be of such material that it will not be acted upon by the acid solution.

The anode and cathode may be of platinum or any other substance or composition which may be found desirable.

At the close of the process there remains a residuum of monobasic phosphate, dibasic phosphate, and other compounds, the character of which depends upon the nature of the elements present and associated with the naturally-occurring phosphate of lime which has been subjected to treatment. This residuum contains so-called "available" phosphoric acid, and alone or when mixed with other substances is adapted to be used as a fertilizer.

In some instances I propose to modify the process, especially when I desire to obtain water-soluble or monobasic phosphate. To this end I siphon off or otherwise remove the liquid solution from the receptacle in which the mixture has been electrically treated and evaporate the water. When this is effected by heat, I add to the solution sufficient sulfuric acid or nitric acid to render the same slightly acid. In this way the salts soluble in water remain water-soluble.

While I have specified acid sulfate of soda (niter-cake) as the reagent I propose to use in practice, I may substitute another or others without essentially changing the character of the process.

What I claim is—

1. The process of treating naturally-occurring phosphates, consisting in mixing the same in a finely-divided state with water and an acid salt which by metathesis will change tribasic phosphate to mono or di basic phosphate or both, passing through the mixture for a suitable period of time a current of electricity, and evaporating the water from the mixture.

2. The process of treating naturally-occurring phosphates, consisting in mixing the same with water and acid sulfate of soda (niter-cake), passing through the mixture and for a suitable period of time a current of electricity, and evaporating the water from the mixture.

In testimony whereof I affix my signature in presence of two witnessses.

LEWIS CHEESEMAN, Sr.

Witnesses:
A. H. AGNEW,
H. R. BURKE.